United States Patent
Harnefors et al.

(10) Patent No.: US 8,553,435 B2
(45) Date of Patent: Oct. 8, 2013

(54) POWER CONVERTER WITH MULTI-LEVEL VOLTAGE OUTPUT AND HARMONICS FILTER

(75) Inventors: Lennart Harnefors, Eskilstuna (SE); Björn Jacobson, Grängesberg (SE)

(73) Assignee: ABB Technology AG, Zurich (CH)

( * ) Notice: Subject to any disclaimer, the term of this patent is extended or adjusted under 35 U.S.C. 154(b) by 275 days.

(21) Appl. No.: 13/130,124

(22) PCT Filed: Nov. 21, 2008

(86) PCT No.: PCT/EP2008/065976
§ 371 (c)(1),
(2), (4) Date: Jul. 5, 2011

(87) PCT Pub. No.: WO2010/057532
PCT Pub. Date: May 27, 2010

(65) Prior Publication Data
US 2011/0261598 A1   Oct. 27, 2011

(51) Int. Cl.
*H02M 1/12* (2006.01)
*H02J 1/02* (2006.01)

(52) U.S. Cl.
USPC .............................. 363/40; 307/105; 363/131

(58) Field of Classification Search
USPC ............. 363/39, 40, 41, 42, 43, 44, 127, 131, 363/132; 307/105
See application file for complete search history.

(56) References Cited

U.S. PATENT DOCUMENTS

| | | | |
|---|---|---|---|
| 4,224,660 A * | 9/1980 | Mohan | 363/48 |
| 5,274,541 A * | 12/1993 | Kimura et al. | 363/56.02 |
| 2004/0022081 A1 * | 2/2004 | Erickson et al. | 363/159 |
| 2006/0227582 A1 | 10/2006 | Wei et al. | |
| 2007/0121348 A1 | 5/2007 | Ponnaluri et al. | |
| 2008/0310205 A1 | 12/2008 | Hiller | |
| 2010/0118578 A1 | 5/2010 | Dommaschk et al. | |

FOREIGN PATENT DOCUMENTS

| | | |
|---|---|---|
| DE | 101 03 031 A1 | 7/2002 |
| EP | 1 544 992 A1 | 6/2005 |
| GB | 2 397 445 A | 7/2004 |
| WO | WO 2007/033852 A2 | 3/2007 |
| WO | WO 2008/067785 A1 | 6/2008 |

OTHER PUBLICATIONS

Peng et al., "A Series LC Filter for Harmonic Compensation of AC Drives", Power Electronics Specialists Conference, vol. 1, pp. 213-218, Jun. 27, 1999.

* cited by examiner

*Primary Examiner* — Gary L Laxton
(74) *Attorney, Agent, or Firm* — Birch, Stewart, Kolasch & Birch, LLP

(57) ABSTRACT

A device for converting a DC voltage into an AC voltage and vice versa comprises at least one phase leg with a first voltage source and a first inductor connected in series between a first DC terminal and a first AC terminal and with a second inductor and a second voltage source connected in series between the first AC terminal and a second DC terminal, where each of the voltage sources comprises at least a first and a second submodule in series-connection, each submodule comprising at least one power electronic switch connected in parallel with at least one capacitor. In the device, a passive electronic filter is arranged between the first and the second inductor as well as the first AC terminal for reducing harmonics in a circulating current.

20 Claims, 4 Drawing Sheets

POWER CONVERTER WITH MULTI-LEVEL VOLTAGE OUTPUT AND HARMONICS FILTER

Figure 1:
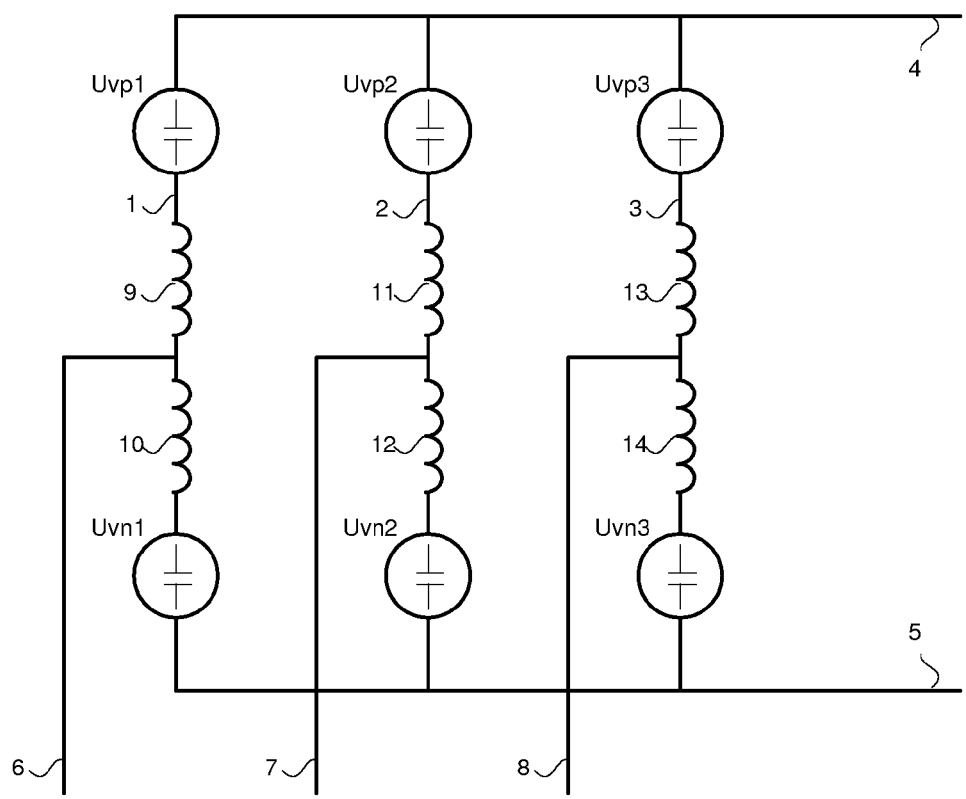

The invention is related to a power converter with multi-level voltage output described as a device for converting a DC voltage into an AC voltage and vice versa comprising at least one phase leg with a first voltage source and a first inductor connected in series between a first DC terminal and a first AC terminal and with a second inductor and a second voltage source connected in series between the first AC terminal and a second DC terminal, where each of the voltage sources comprises at least a first and a second submodule in series-connection, each submodule comprising at least one power electronic switch connected in parallel with at least one capacitor.

In the art, multi-level converters are known to be used in order to reduce harmonic distortion in the output of voltage source converters. A multilevel converter is a converter where the output voltage—or, in case of a multiphase converter, the voltages—can assume several discrete levels, as can be seen for example in DE10103031.

In WO 2008/067785 A1, a multi-level converter according to DE10103031 is disclosed which in addition comprises at least one inductor in each phase leg as well as regulating means to regulate a circulating current flowing through the phase legs, i.e., the current that closes between the phase legs but does not enter the AC grid through the AC terminal.

If the circulating-current is controlled, as described in WO 2008/067785 A1, the voltage rating of the power electronic switches of the converter must allow for the extra voltage needed to regulate the circulating currents in the desired manner.

It is therefore an object of the invention to propose a power converter which allows for regulation of the circulating currents in a desired manner, where the required voltage rating of the power semiconductor switches is affected as little as possible.

This object is achieved by a device according to claim 1.

The device for converting a DC voltage into an AC voltage and vice versa as described above, comprises according to the invention a passive electronic filter which is arranged between the first and the second inductor as well as the first AC terminal. The passive electronic filter is adjusted to reduce harmonics in a circulating current.

The invention is based on the recognition of the fact that the desired manner in which the circulating currents should best be regulated is to reduce the harmonics which occur at specific frequencies in the circulating current, rather than to reduce the circulating currents in general. What the inventor realized is that at each switching event in the power electronic switches of the converter, harmonics appear in the circulating current causing increased losses. As a worst case, some of the harmonics with distinctively high amplitude in the circulating currents could even lead to system instability. The introduction of additional inductors, as described in WO 2008/067785 A1, helps to obtain a general current limitation in the converter circuit but does nothing to avoid the distinctive harmonics as such.

By introducing a passive electronic filter that reduces or in the best case completely blocks the harmonics with the highest amplitude, it is avoided that the control unit which controls the power semiconductor switches sees and takes into account the most disturbing components of the circulating currents, so that the requirements on the voltage rating of the power semiconductor switches can thereby be reduced.

A closer look at the harmonics in the circulating currents revealed the following: The sum of the voltage ripple over the submodules of both phase module branches in one phase leg shows in its frequency spectrum a main component at twice the fundamental frequency of the AC voltage. This main frequency component creates a parasitic harmonic component in the circulating current that is also of twice the fundamental frequency. Unless this component is somehow limited, increased losses will result; possibly even loss of system stability.

Therefore, according to a preferred embodiment of the invention, the parameters of the electronic filter are chosen so that harmonics at twice the fundamental frequency of the AC voltage are reduced, thereby specifically reducing the main disturbing component of the circulating current.

Figure 2:
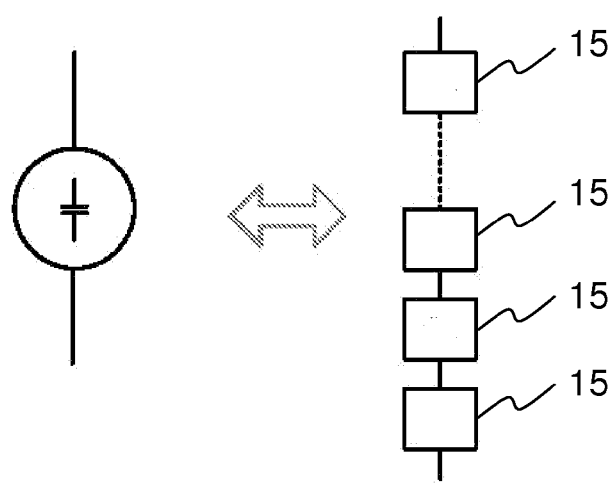
Figure 3:
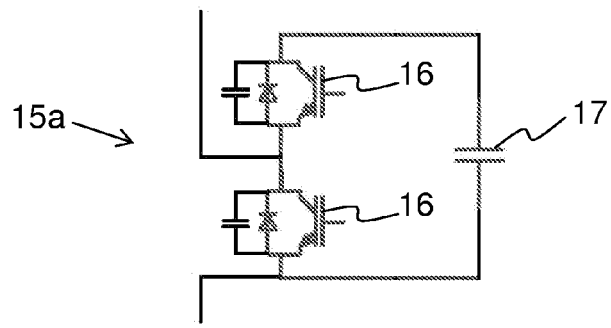
Figure 4:
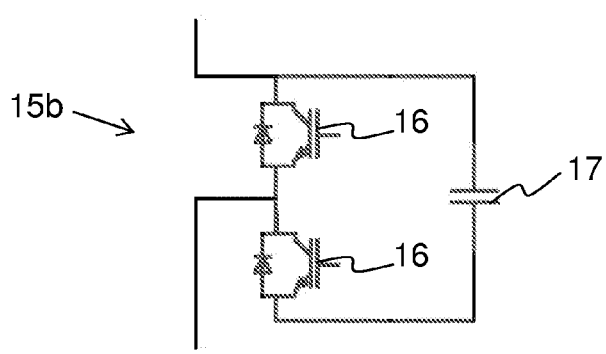
Figure 4:
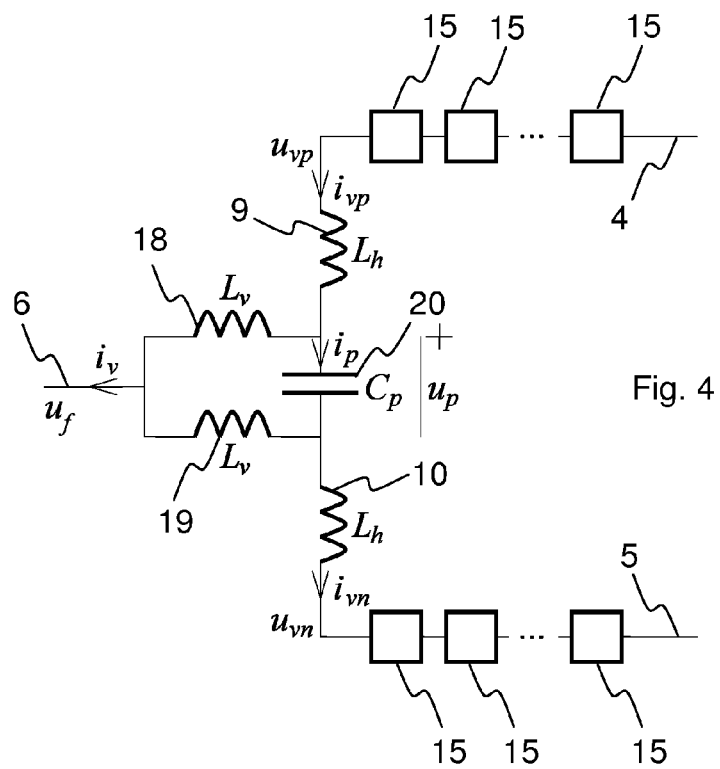
Figure 5:
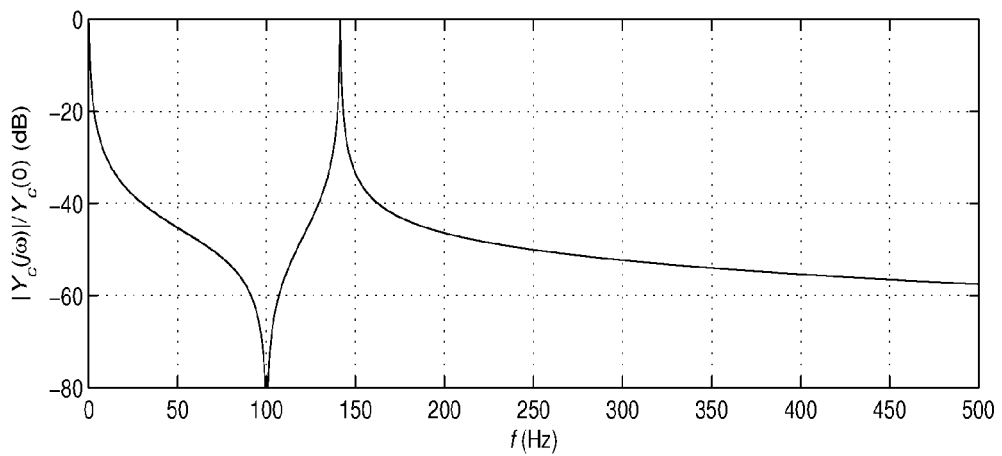
Figure 6:
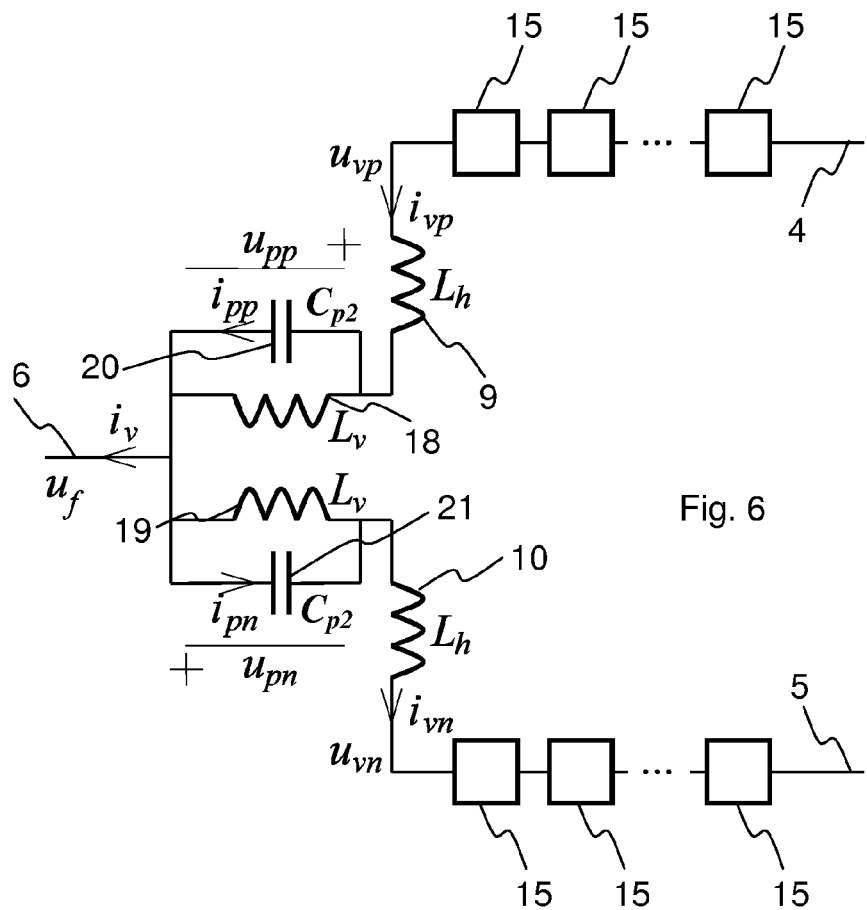
Figure 7:
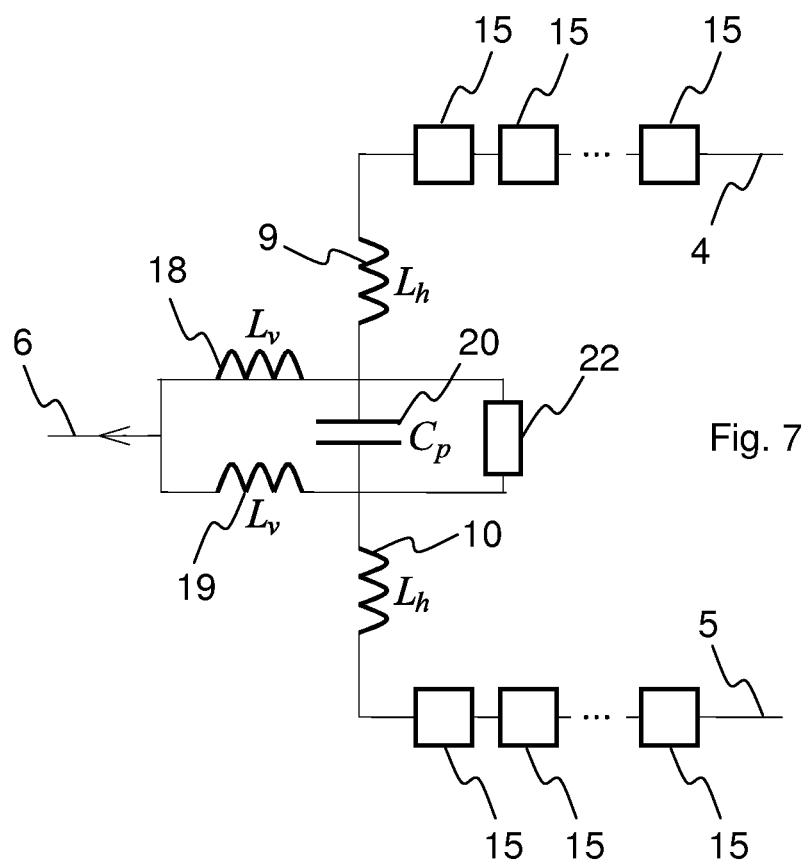

Other features and advantages of the present invention will become more apparent to a person skilled in the art from the following detailed description in conjunction with the appended drawings in which:

FIG. 1 shows a converter topology as is known from the art,

FIG. 2 shows the setup of the voltage sources in the phase legs of the converter of FIG. 1 as known from the art, FIG. 3 shows two different embodiments of the submodules in the converter of FIGS. 1 and 2, FIG. 4 shows one phase leg of a converter with an electronic filter according to one embodiment of the invention, FIG. 5 shows the modulus of admittance for the circulating current of the embodiment of FIG. 4 with appropriate parameter settings and FIG. 6 shows one phase leg of a converter with an electronic filter according. to another embodiment of the invention, FIG. 7 shows one phase leg of a converter with an electronic filter according to FIG. 4 and an additional resistor.

The device for converting a DC voltage into an AC voltage and vice versa according to the invention can contain either a single phase leg or multiple phase legs, depending on how many phases the AC voltage has. FIG. 1 shows a three-phase converter known in the art. The three phase legs 1, 2 and 3 of the device of FIG. 1 each comprise two so-called arms in series-connection: a positive, upper arm which is connected to a first DC terminal 4 at a positive voltage level, and a negative, lower arm, which is connected to a second DC terminal 5 at zero or a negative voltage level. Each positive arm comprises a series-connection of an upper voltage source Uvpi and a first inductor 9, 11 or 13, respectively, and each negative arm comprises a second inductor 10, 12 or 14, respectively, and a lower voltage source Uvni, where i stands for the number of the corresponding phase leg. The midpoint or connection point between the first and second inductors of each phase leg is each connected to an AC terminal 6, 7 or 8, respectively. All the phase legs are connected in parallel to each other and to the two DC terminals 4 and 5. By appropriately controlling the voltage sources of the phase legs over time, the AC to DC conversion is made.

As is shown in FIG. 2, each voltage source is made up of a series connected string of submodules 15, where at least two submodules 15 are comprised in one such string.

From FIG. 3, two different embodiments 15a and 15b of the submodules 15, which are known in the art, can be seen. Any combination of the submodules is possible within each voltage source. The submodules have the form of commutation cells, each cell comprising two valves and a large DC capacitor holding a direct voltage. The main valves are equipped with a power electronic switch 16 with turn-off capability and a free-wheeling diode in anti-parallel connection to the switch. Depending on which of the two power electronic switches 16 is conducting, the corresponding submodule can assume one of two switching states, where in state one zero voltage or in state two the capacitor voltage is applied to the output.

According to an embodiment of the invention, the converter according to FIGS. 1 to 3 is additionally equipped with a passive electronic filter in each phase leg, as is depicted in FIG. 4 for phase leg 1. A first capacitor 20 is arranged in series with the first and the second inductors 9 and 10, a third inductor 18 is arranged between the first inductor 9 and the first AC terminal 6 and a fourth inductor 19 is arranged between the second inductor 10 and the first AC terminal 6.

The symbols in FIG. 4 have the following meaning:

$u_{vp/n}$ voltage of the voltage source in positive or negative arm, respectively;
$i_{vp/n}$ current in positive/negative arm;
$i_v$ output current at AC terminal;
$u_f$ voltage at AC terminal (AC voltage);
$u_p$ voltage across first capacitor;
$i_p$ current through first capacitor;
$L_h$ inductance of first and second inductor;
$L_v$ inductance of third and fourth inductor;
$C_p$ capacitance of first capacitor;
$r$ inner resistance of each inductor (not shown in figures).

In the following it is described, how the parameters of the electronic filter are chosen in order to reduce the most disturbing harmonics of the circulating current in the depicted phase 1.

The governing equation for the circulating current $i_c = (i_{vp} + i_{vn})/2$ can be obtained by applying Kirchhoff's voltage law to the direct path from $u_{vp}$ to $u_{vn}$, giving $$u_{vp} - L_h \frac{di_{vp}}{dt} - ri_{vp} - u_p - L_h \frac{di_{vn}}{dt} - ri_{vn} = u_{vn}. \quad (1)$$

Introducing the differential voltage $u_{vc} = (u_{vp} - u_{vn})/2$ allows equation (1) to be simplified to $$L_h \frac{di_c}{dt} = u_{vc} - ri_c - \frac{1}{2} u_p. \quad (2)$$

It is seen that $u_{vc}$ is the driving voltage for the circulating current. This voltage is controllable, i.e., it can be made to follow a reference $u_{vc}^{ref}$, but it also contains a parasitic term $\Delta u_{vc}$ as $$u_{vc} = u_{vc}^{ref} + \Delta u_{vc}. \quad (3)$$

Taking the loop around the circuit consisting of $C_p$ and the two $L_v$ yields $$u_p = L_v \frac{d(i_{vp} - i_p)}{dt} + r(i_{vp} - i_p) + L_v \frac{d(i_{vn} - i_p)}{dt} + \quad (4)$$

$$r(i_{vn} - i_p) \Rightarrow L_v \frac{di_p}{dt}$$

$$= L_v \frac{di_c}{dt} + r(i_c - i_p) - \frac{1}{2} u_p.$$

Equations (2) and (4) can be combined with the relation $C_p du_p/dt = i_p$ to form a third-order state-space system:

$$\frac{di_c}{dt} = -\frac{r}{L_h} i_c - \frac{1}{2L_h} u_p + \frac{1}{L_h} u_{vc} \quad (5)$$

$$\frac{di_p}{dt} = r\left(\frac{1}{L_h} - \frac{1}{L_v}\right) i_c - \frac{r}{L_v} i_p - \frac{1}{2}\left(\frac{1}{L_v} + \frac{1}{L_h}\right) u_p + \frac{1}{L_h} u_{vc}$$

$$\frac{du_p}{dt} = \frac{1}{C_p} i_p.$$

Analysis of the frequency dependent behavior of the system according to equations (5) shows that the parasitic term $\Delta u_{vc}$ consists of the following three harmonic components:

1) a first component at twice the fundamental frequency of the AC voltage whose amplitude is normally a few percents of the rated AC voltage;
2) a second component at four times the fundamental frequency whose amplitude is a fraction of 1);
3) a third component comprising switching harmonics.

Since the first component has the biggest amplitude of the three components, this component would result in harmonics of the circulating current with the highest peaks. Accordingly, in order to reduce the losses resulting from these peaks, it is desirable to reduce the first component.

With the electronic filter according to FIG. 4, blocking of the component 1) becomes possible. Based on the system according to equations (5), the parameters of the electronic filter are calculated for blocking twice the fundamental frequency.

If the capacitance $C_p$ is set to be $$C_p = \frac{1}{8\omega_B^2 L_v} \quad (6)$$

where $\omega_B$, is the fundamental (base) angular frequency, the parallel circuit $C_p \| 2L_v$ becomes tuned to the angular frequency $2\omega_B$. The resonance frequency of the system according to equations (5), i.e., the imaginary part of the complex-conjugated pole pair of (5), then becomes $$\omega_0 = \sqrt{\frac{1}{2C_p}\left(\frac{1}{L_v} + \frac{1}{L_h}\right)} = \{(6)\} = 2\omega_B \sqrt{1 + \frac{L_v}{L_h}}. \quad (7)$$

The inductance $L_v$ of the third and the fourth inductors must be selected such that $\omega_0 < 4\omega_B$ in order to prevent amplification of the second and the third harmonic components. This implies that the inductance $L_h$ of the first and the second inductors and the inductance $L_v$ of the third and the fourth inductors should be selected in the same region, possibly as $L_h = L_v$.

The blocking ability of the electronic filter according to FIG. 4 is in the following illustrated with the help of an example. Suppose that for a converter with the fundamental frequency $$\frac{\omega_B}{2 \cdot \pi} = 50 \text{ Hz},$$

a total inductance of $L_v + L_h = 50$ mH per arm is desired. For equally sized inductors, this results in $L_v = L_h = 25$ mH. Equation (6) yields $C_p = 50.66$ μF. Suppose also that the inner resistance of each inductor $r = 50$ mΩ, which is a realistic value. The resulting modulus of the admittance $Y_c(s)$ for the circulating current, i.e., the transfer function from $\Delta u_{vc}$ to $i_c$ resulting from equation (5), is shown in FIG. 5. The following can be noted:

Twice the fundamental frequency i.e. 100 Hz, is blocked as desired, removing the first harmonic component.

Even though the resonant peak at slightly below three times the fundamental frequency, in this example between about 130 and 170 Hz is fairly high, the frequency range from 200 Hz, i.e., four times the fundamental frequency, and above has adequate damping. The second and third harmonic components are therefore satisfactorily attenuated.

In an alternative embodiment of the invention, the electronic filter may comprise two sub-filters, each placed in one of the two arms of the phase leg, as shown in FIG. 6.

There, a first capacitor 20 and a third inductor 18, forming a first sub-filter, are arranged in parallel with each other and between the first inductor 9 and the first AC terminal 6. A second capacitor 21 and a fourth inductor 19, forming a second sub-filter, are arranged in parallel with each other and between the second inductor 10 and the first AC terminal 6. The capacitance $C_{p2}$ of the first and the second capacitors is set to be twice the capacitance $C_p$ of the first capacitor in the embodiment according to FIG. 4, i.e., $C_{p2}=2\cdot C_p$.

In comparison to the embodiment according to FIG. 4, the total installed capacitance of the system in FIG. 6 is four times that of the system according to FIG. 4, i.e. $4C_p$ instead of $C_p$, where $C_p$ is given by equation (6). On the other hand, the voltage across each capacitance in FIG. 6 is only half of that in FIG. 4.

With respect to the admittance, it can be understood that, seen from $u_{vp}$ to $u_{vn}$, the circuit in FIG. 6 is identical to that of FIG. 4. Accordingly, the same admittance $Y_c(s)$ results for the circulating current, as was obtained from equations (5). Since the sub-filters in both arms are identical and the circuit is symmetric with respect to the two arms, the currents flowing in both sub-filters have the same value, i.e., $i_{pp}=i_{pn}$, except for the possibility of initial transients caused by imbalance.

As was shown with the example of FIG. 5, a passive electronic filter comprising at least a capacitor and at least an inductor, where the inductor has naturally an inner resistance, is sufficient to both block the most disturbing harmonic component of the circuit current and at the same time achieve reasonable damping for the other frequency ranges. If further damping in the other frequency ranges is desired, especially in order to reduce harmonics which are introduced by the electronic filter, a resistor 21 can be arranged in parallel with the first capacitor 20, as is depicted in FIG. 7. The resistance of that resistor 21 needs to be chosen considerably high in order to avoid unnecessary losses.

Alternatively, a control unit, which in any case would be present in a converter according to the invention to control the output voltages of the voltage sources in each phase leg to perform the AC/DC conversion, could be adjusted in such a way, that the voltages of the first and the second voltage sources are controlled so that harmonics introduced by the electronic filter are reduced.

In the example of FIG. 5, the most disturbing harmonics introduced by the electronic filter are those at about triple the fundamental frequency, i.e., just below 150 Hz. These can be reduced by either introducing the above described resistor or by controlling the voltage sources accordingly.

The invention claimed is:

1. Device for converting a DC voltage into an AC voltage and vice versa comprising at least one phase leg with a first (Uvp1) voltage source and a first inductor connected in series between a first DC terminal and a first AC terminal and with a second inductor and a second (Uvn1) voltage source connected in series between the first AC terminal and a second DC terminal, where each of the voltage sources comprises at least a first and a second submodule in series-connection, each submodule comprising at least two power electronic switches connected in parallel with at least one capacitor, wherein a passive electronic filter is arranged between the first and the second inductor as well as the first AC terminal and where the parameters of the electronic filter are chosen so that harmonics at twice the fundamental frequency of the AC voltage are reduced, the filter comprises a third and fourth inductor, where the third inductor is arranged between the first inductor and the first AC terminal, the fourth inductor is arranged between the second inductor and the first AC terminal and the third and fourth inductors have the same value.

2. Device according to claim 1, where the electronic filter comprises at least a first capacitor.

3. Device according to claim 1, where at least a first resistor is arranged in parallel to the first capacitor, the resistance of which is chosen so that harmonics excited by the electronic filter are reduced.

4. Device according to claim 1, comprising a control unit to control the voltages of the first and the second voltage sources so that harmonics excited by the electronic filter are reduced.

5. Device according to claim 3, where harmonics at around triple the fundamental frequency of the AC voltage are reduced.

6. Device according to claim 2, where the first capacitor is arranged in series with the first and the second inductors.

7. Device according to claim 6, where the inductances (Lh) of the first and the second inductors are of the same value and where the inductances (Lv) of the third and fourth inductors are set to have approximately the same value as the inductance (Lh) of the first and the second inductors.

8. Device according to claim 7, where the capacitance ($C_p$) of the first capacitor is set to be of the following value:

$$C_p = \frac{1}{8\omega_B^2 L_v},$$

where $\omega_B$ is the fundamental frequency of the AC voltage.

9. Device according to claim 7, where the capacitance ($C_{p2}$) of the first capacitor is set to be of the following value:

$$C_{p2} = \frac{1}{4\omega_B^2 L_v},$$

where $\omega_B$ is the fundamental frequency of the AC voltage.

10. Device according to claim 7, where at least a first resistor is arranged in parallel to the first capacitor, the resistance of which is chosen so that harmonics excited by the electronic filter are reduced.

11. Device according to claim 6, where the capacitance ($C_p$) of the first capacitor is set to be of the following value:

$$C_p = \frac{1}{8\omega_B^2 L_v},$$

where $\omega_B$ is the fundamental frequency of the AC voltage.

12. Device according to claim 11, where at least a first resistor is arranged in parallel to the first capacitor, the resistance of which is chosen so that harmonics excited by the electronic filter are reduced.

13. Device according to claim 6, where at least a first resistor is arranged in parallel to the first capacitor, the resistance of which is chosen so that harmonics excited by the electronic filter are reduced.

14. Device according to claim 6, comprising a control unit to control the voltages of the first and the second voltage sources so that harmonics excited by the electronic filter are reduced.

15. Device according to claim 2, where the first capacitor and the third inductor are arranged in parallel with each other and between the first inductor and the first AC terminal and where a second capacitor and a fourth inductor are arranged in parallel with each other and between the second inductor and the first AC terminal.

16. Device according to claim 15, where the capacitance ($C_{p2}$) of the first capacitor is set to be of the following value:

$$C_{p2} = \frac{1}{4\omega_B^2 L_v},$$

where $\omega$hd B is the fundamental frequency of the AC voltage.

17. Device according to claim 16, where at least a first resistor is arranged in parallel to the first capacitor, the resistance of which is chosen so that harmonics excited by the electronic filter are reduced.

18. Device according to claim 15, where the inductances (Lh) of the first and the second inductors are of the same value and where the inductances (Lv) of the third and fourth inductors are set to have approximately the same value as the inductance (Lh) of the first and the second inductors.

19. Device according to claim 15, where at least a first resistor is arranged in parallel to the first capacitor, the resistance of which is chosen so that harmonics excited by the electronic filter are reduced.

20. Device according to claim 15, comprising a control unit to control the voltages of the first and the second voltage sources so that harmonics excited by the electronic filter are reduced.

* * * * *